(12) United States Patent
Zou et al.

(10) Patent No.: US 11,130,087 B2
(45) Date of Patent: Sep. 28, 2021

(54) FLAME-RETARDANT ANTIBACTERIAL COMPOSITE POLYPROPYLENE FILTER MATERIAL AND PREPARATION METHOD THEREOF

(71) Applicant: Nanjing YRD ECO Development RI Co., Ltd., Nanjing (CN)

(72) Inventors: Weiwei Zou, Nanjing (CN); Jun Bi, Nanjing (CN); Changchun Ding, Nanjing (CN); Zongwei Ma, Nanjing (CN); Hongchao Liang, Nanjing (CN)

(73) Assignee: NANJING YRD ECO DEVELOPMENT RI CO., LTD., Nanjing (CN)

( * ) Notice: Subject to any disclaimer, the term of this patent is extended or adjusted under 35 U.S.C. 154(b) by 0 days.

(21) Appl. No.: 17/258,161

(22) PCT Filed: Mar. 24, 2020

(86) PCT No.: PCT/CN2020/080778
§ 371 (c)(1),
(2) Date: Jan. 6, 2021

(87) PCT Pub. No.: WO2021/077675
PCT Pub. Date: Apr. 29, 2021

(65) Prior Publication Data
US 2021/0178303 A1  Jun. 17, 2021

(30) Foreign Application Priority Data
Oct. 23, 2019  (CN) .......................... 201911011344.1

(51) Int. Cl.
| | | |
|---|---|---|
| *B01D 46/00* | (2006.01) | |
| *C08K 3/04* | (2006.01) | |
| *C08K 3/08* | (2006.01) | |
| *C08L 23/12* | (2006.01) | |
| *B01D 46/10* | (2006.01) | |
| *C08K 3/34* | (2006.01) | |

(52) U.S. Cl.
CPC ..... *B01D 46/0028* (2013.01); *B01D 46/0032* (2013.01); *B01D 46/0093* (2013.01); *B01D 46/10* (2013.01); *C08K 3/042* (2017.05); *C08K 3/08* (2013.01); *C08K 3/34* (2013.01); *C08L 23/12* (2013.01); *B01D 2247/02* (2013.01); *C08K 2003/0806* (2013.01); *C08K 2201/011* (2013.01); *C08L 2201/02* (2013.01); *C08L 2207/10* (2013.01)

(58) Field of Classification Search
CPC ............ B01D 46/0028; B01D 46/0032; B01D 46/0093; B01D 46/10; B01D 2247/02; B01D 46/0063; C08K 3/042; C08K 3/08; C08K 3/34; C08K 2003/0806; C08K 2201/011; C08L 23/12; C08L 2201/02; C08L 2207/10
USPC ........................................................... 96/226
See application file for complete search history.

(56) References Cited

U.S. PATENT DOCUMENTS

2015/0166770 A1* 6/2015 Krishnamurthy .... C08K 5/5333
522/43

FOREIGN PATENT DOCUMENTS

| CN | 102558684 A | 7/2012 |
|---|---|---|
| CN | 203260894 U | 10/2013 |
| CN | 103965546 A | 8/2014 |
| CN | 105214384 A * | 1/2016 |
| CN | 106690577 A | 5/2017 |
| CN | 106810854 A * | 6/2017 |
| CN | 107201065 A | 9/2017 |
| CN | 107337933 A | 11/2017 |
| CN | 108504066 A | 9/2018 |
| CN | 109251453 A | 1/2019 |
| CN | 110200012 A | 9/2019 |
| CN | 110819001 A | 2/2020 |
| JP | 2017132913 A | 8/2017 |
| KR | 101264313 B1 * | 5/2013 |

OTHER PUBLICATIONS

KR 101264313 B1, machine translation, EPO espacenet. (Year: 2013).*
Li et al., "Synthesis and Characterization of Polymerizable Tourmaline Methacrylate," e-J. Surf. Sci. Nanotech., vol. 13, 422-425. (Year: 2015).*

(Continued)

*Primary Examiner* — Josephine L Chang
(74) *Attorney, Agent, or Firm* — Bayramoglu Law Offices LLC

(57) ABSTRACT

A flame-retardant antibacterial composite polypropylene filter material and a preparation method thereof are disclosed. The filter material includes the following components in weight percent: 70-90 wt % of isotactic polypropylene, 3-10 wt % of a functional negative ion-releasing material, 3-10 wt % of a nano-antibacterial agent, 2-5 wt % of graphene oxide, 0.5-5 wt % of a flame retardant and 1-3 wt % of a dispersant. The filter material of the present invention can be prepared into network, fabric and other forms by the melt-blending extrusion, which can be applied for air pollutant removal in different environments. The functional negative ion-releasing material is a piezoelectric material, which can spontaneously produce negative oxygen ions, without consumption of energy or producing secondary pollution such as ozone. The released negative oxygen ions interact with positively charged particles in the air for settling, so as to quickly remove the particles.

10 Claims, No Drawings

(56) References Cited

OTHER PUBLICATIONS

CN 105214384 A, machine translation, EPO espacenet. (Year: 2016).*
Hutton, "4.3.5.3.2 Polypropylene," Handbook of Nonwoven Filter Media, Elsevier. (Year: 2016).*
CN 106810854 A, machine translation, EPO espacenet. (Year: 2017).*

* cited by examiner

FLAME-RETARDANT ANTIBACTERIAL COMPOSITE POLYPROPYLENE FILTER MATERIAL AND PREPARATION METHOD THEREOF

CROSS REFERENCE TO THE RELATED APPLICATIONS

This application is the national phase entry of International Application No. PCT/CN2020/080778, filed on Mar. 24, 2020, which is based upon and claims priority to Chinese Patent Application No. 201911011344.1, filed on Oct. 23, 2019, the entire contents of which are incorporated herein by reference.

TECHNICAL FIELD

The present invention relates to an air filter material, and in particular to a flame-retardant antibacterial composite polypropylene filter material and a preparation method thereof.

BACKGROUND

Air purification is a subject gaining special attention. Air purification projects in public buildings are on the increase. Air filter materials are widely used in large-scale integrated entities such as metro, hospitals, hotels and shopping malls. The purification of particulate matter in the air typically includes physical purification and electrostatic purification. The physical purification has attracted much attention due to its high efficiency. The high efficiency particulate air (HEPA) filter is the most widely used filtration and purification technology for particulate matter.

The filter medium of HEPA filter is made of fine polymer fiber material, which is believed to remove 99.97% of particles above 0.3 μm. The filter medium is the key factor related to whether the concentration of particulate matter meets regulated standards. However, present HEPA materials do not have antibacterial and flame-retardant functions. On the one hand, in practical work, due to the accumulation of microorganisms on the surface of materials, it is easy to cause spoilage and harmful odor release. On the other hand, in case of fire, it is easy to cause fire spread as a flammable component, resulting in secondary damage.

Small pore size, high filtration resistance, complex preparation and non-reusability all result in waste of resources and increased filtration costs. High voltage electrostatic filtration technology has been widely used in recent years due to its long service life, low resistance and infrequent replacement. The principle is that the dust-containing gas is electrically separated when passing through a high-voltage electrostatic field, and after the dust particles combine with negative ions to be negatively charged, they tend to discharge and deposit on the surface of the anode. Because electrostatic dust removal requires a relatively high voltage during operation, pollutants, such as ozone may be produced as a secondary by-product. Moreover, the efficiency of electrostatic dust removal is greatly affected by ambient temperature and humidity, and the purification efficiency is not stable enough. As a practical matter, due to the high voltage, fire hazards are a legitimate concern.

SUMMARY

In view of the above-mentioned deficiencies in the prior art, the technical problem to be solved by the present invention is to provide a flame-retardant antibacterial composite polypropylene filter material and a preparation method thereof. The new flame-retardant antibacterial composite polypropylene filter material has good antibacterial and flame-retardant properties, and a piezoelectric material can spontaneously produce negative oxygen ions, without consumption of energy or producing secondary pollution such as ozone.

To achieve the above objective, the technical solution of the present invention is as follows. A flame-retardant antibacterial composite polypropylene filter material includes the following components in weight percent: 70-90 wt % of isotactic polypropylene, 3-10 wt % of a functional negative ion-releasing material, 3-10 wt % of a nano-antibacterial agent, 2-5 wt % of graphene oxide, 0.5-5 wt % of a flame retardant and 1-3 wt % of a dispersant.

In order to optimize the above technical solution, the specific measures taken by the present invention are further presented below.

The functional negative ion-releasing material is a piezoelectric material.

Further, the piezoelectric material is at least one selected from the group consisting of modified tourmaline and modified maifanite.

The nano-antibacterial agent is at least one selected from the group consisting of silver nanoparticles, copper oxide nanoparticles and cuprous oxide nanoparticles.

The flame retardant is at least two selected from the group consisting of ammonium polyphosphate, pentaerythritol, melamine-formaldehyde resin, aluminum hydroxide, sodium diethylphosphinate, phosphate ester and phosphite ester.

The dispersant is at least one selected from the group consisting of a cellulose derivative, polyacrylamide and fatty acid polyglycol ester.

A preparation method of the flame-retardant antibacterial composite polypropylene filter material described in the above technical solution, including the following steps:

1) preparation of the functional negative ion-releasing material: weighing a 500-1000 mesh piezoelectric material to place in a three-necked flask, adding N,N-dimethylformamide (DMF) as a solvent, stirring and heating to 30-50° C. and keeping a constant temperature, adding methacrylic anhydride dropwise and slowly into the three-necked flask, wherein a mixing ratio of the piezoelectric material, the DMF and the methacrylic anhydride is 1 g:100 ml:1 ml; stirring fully for 1.5-4 h, filtering out a filtrate and rinsing with alcohol for 3-5 times, then drying at 50-100° C. to obtain the functional negative ion-releasing material;

2) preparation of the flame-retardant antibacterial composite polypropylene filter material: adding a mixture consisting of 70-90 wt % of the isotactic polypropylene, 3-10 wt % of the functional negative ion-releasing material, 3-10 wt % of the nano-antibacterial agent, 2-5 wt % of the graphene oxide, 0.5-5 wt % of the flame retardant and 1-3 wt % of the dispersant into a mixer, and mixing the mixture fully and then performing a melt-blending extrusion to obtain the flame-retardant antibacterial composite polypropylene filter material.

In step 1), the piezoelectric material is at least one selected from the group consisting of modified tourmaline and modified maifanite.

In step 2), the mixture is fully mixed and then added into a twin-screw extruder. After the mixture is extruded by the extruder, the flame-retardant antibacterial composite polypropylene filter material is obtained. Working parameters of the twin-screw extruder are as follows: a screw speed is 50 r/min, and temperatures in extruder barrels are set as: 160° C. in a first zone, 170° C. in a second zone, 180° C. in a third zone and 160° C. in a fourth zone.

The present invention has the following advantages.

(1) The piezoelectric material used in the present invention can spontaneously produce negative oxygen ions, the produced negative oxygen ions interact with the positively charged particles in the air to settle or adsorb on the surface of the material, so as to quickly remove the particles in the air. Meanwhile, the piezoelectric material used in the present invention is a natural mineral material that can permanently release negative ions. Compared with the method of obtaining negative ions artificially, the piezoelectric material releases negative oxygen ions without consuming energy or producing secondary pollution such as ozone.

(2) The present invention adopts more than two kinds of flame retardants for combined use, significantly improves the flame retardancy of the material and expands the application ranges of the filter material through the synergistic flame retardancy of the combined flame retardants.

(3) The present invention adopts graphene oxide as a conductive modifier, which can enhance the negative ion-releasing capacity of the piezoelectric material, and complement the antibacterial effect of the nano-antibacterial agent, and can effectively kill various bacteria, such as *Staphylococcus aureus* and *Escherichia coli*, etc. and inhibit their growth and reproduction.

(4) The flame-retardant antibacterial composite polypropylene filter material of the present invention can be prepared into fiber, network, fabric, mesh and other forms by the melt-blending extrusion, which can meet the filtering requirements of air pollutant such as $PM_{2.5}$ in different environments, and has wide application scope.

DETAILED DESCRIPTION OF THE EMBODIMENTS

The present invention will be further described by the following embodiments.

Embodiment 1

A flame-retardant antibacterial composite polypropylene filter material includes the following components in weight percent: 90 wt % of isotactic polypropylene as a substrate, 3 wt % of modified tourmaline as a functional negative ion-releasing material, 3 wt % of a combined material consisting of copper oxide nanoparticles and cuprous oxide nanoparticles as a nano-antibacterial agent, 2 wt % of graphene oxide as a conductive modifier, 1 wt % of a combined material consisting of ammonium polyphosphate, pentaerythritol and melamine-formaldehyde resin as a flame retardant, and 1 wt % of a cellulose derivative as a dispersant.

A preparation method of the flame-retardant antibacterial composite polypropylene filter material described in embodiment 1, including the following steps:

1) preparation of modified tourmaline: 600 mesh tourmaline powder is weighed and put in a three-necked flask, DMF is added as a solvent, stirred and heated to 50° C. to keep a constant temperature, methacrylic anhydride is added dropwise and slowly into the three-necked flask, and a mixing ratio of the tourmaline powder, the DMF and the methacrylic anhydride is 1 g:100 ml:1 ml; the mixture is stirred fully for 2 h, a filtrate is filtered out, and the mixture is rinsed with alcohol 5 times, then dried at 70° C. to obtain the modified tourmaline;

2) preparation of the flame-retardant antibacterial composite polypropylene filter material: a mixture consisting of 90 wt % of isotactic polypropylene substrate, 3 wt % of the modified tourmaline, 3 wt % of a nano-antibacterial agent (a combined material consisting of copper oxide nanoparticles and cuprous oxide nanoparticles), 2 wt % of graphene oxide, 1 wt % of a flame retardant (a combined material consisting of ammonium polyphosphate, pentaerythritol and melamine-formaldehyde resin), and 1 wt % of a cellulose derivative is added into a mixer, the mixture is fully mixed and then added into a twin-screw extruder, after the mixture is extruded by the extruder, the flame-retardant antibacterial composite polypropylene filter material is obtained.

Further, working parameters of the twin-screw extruder in step 2) are as follows: the screw speed is 50 r/min, and the temperatures in the extruder barrels are set as: 160° C. in the first zone, 170° C. in the second zone, 180° C. in the third zone, and 160° C. in the fourth zone.

Embodiment 2

A flame-retardant antibacterial composite polypropylene filter material includes the following components in weight percent: 70 wt % of isotactic polypropylene as a substrate, 10 wt % of modified maifanite as a functional negative ion-releasing material, 10 wt % of silver nanoparticles as a nano-antibacterial agent, 3 wt % of graphene oxide as a conductive modifier, 5 wt % of a combined material consisting of sodium diethylphosphinate, phosphate ester and phosphite ester as a flame retardant, and 2 wt % of polyacrylamide as a dispersant.

A preparation method of the flame-retardant antibacterial composite polypropylene filter material described in embodiment 2, including the following steps:

1) preparation of modified maifanite: 1000 mesh maifanite powder is weighed and put in a three-necked flask, DMF is added as a solvent, stirred and heated to 40° C. to keep a constant temperature, methacrylic anhydride is added dropwise and slowly into the three-necked flask, and a mixing ratio of the maifanite powder, the DMF and the methacrylic anhydride is 1 g:100 ml:1 ml; the mixture is stirred fully for 3 h, a filtrate is filtered out, and the mixture is rinsed with alcohol for 4 times, then dried at 90° C. to obtain the modified maifanite;

2) preparation of the flame-retardant antibacterial composite polypropylene filter material: a mixture consisting of 70 wt % of isotactic polypropylene substrate, 10 wt % of the modified maifanite, 10 wt % of silver nanoparticles, 3 wt % of graphene oxide, 5 wt % of a flame retardant (a combined material consisting of sodium diethylphosphinate, phosphate ester and phosphite ester), and 2 wt % of polyacrylamide is added into a mixer, the mixture is fully mixed and then added into a twin-screw extruder, after the mixture is extruded by the extruder, the flame-retardant antibacterial composite polypropylene filter material is obtained.

Further, working parameters of the twin-screw extruder in step 2) are as follows: the screw speed is 50 r/min, and the temperatures in the extruder barrels are set as: 160° C. in the first zone, 170° C. in the second zone, 180° C. in the third zone, and 160° C. in the fourth zone.

Comparative Example 1

A flame-retardant antibacterial composite polypropylene filter material includes the following 6 components in weight percent: 90 wt % of isotactic polypropylene as a substrate, 3 wt % of modified tourmaline as a functional negative ion-releasing material, 3 wt % of a combined material consisting of copper oxide nanoparticles and cuprous oxide nanoparticles as a nano-antibacterial agent, 2 wt % of graphene oxide as a conductive modifier, 1 wt % of ammonium polyphosphate as a flame retardant, and 1 wt % of a cellulose derivative as a dispersant.

A preparation method of the flame-retardant antibacterial composite polypropylene filter material described in comparative example 1, including the following steps:

a) preparation of modified tourmaline: 600 mesh tourmaline powder is weighed and put in a three-necked flask, DMF is added as a solvent, stirred and heated to 50° C. to keep a constant temperature, methacrylic anhydride is added dropwise and slowly into the three-necked flask, and a ratio of the tourmaline powder, the DMF and the methacrylic anhydride is 1 g:100 ml:1 ml; the mixture is stirred fully for 2 h, a filtrate is filtered out, and the mixture is rinsed with alcohol for 5 times, then dried at 70° C. to obtain the modified tourmaline;

b) preparation of the flame-retardant antibacterial composite polypropylene filter material: according to the weight percent of the components in comparative example 1, isotactic polypropylene substrate, the modified tourmaline, a nano-antibacterial agent, graphene oxide, a flame retardant and a dispersant are added into a mixer, fully mixed and then added into a twin-screw extruder; working parameters of the twin-screw extruder are as follows: the screw speed is 50 r/min, and the temperatures in the extruder barrels are set as: 160° C. in the first zone, 170° C. in the second zone, 180° C. in the third zone, and 160° C. in the fourth zone; after the mixture is extruded by the extruder, the flame-retardant antibacterial composite polypropylene filter material is obtained.

Comparative Example 2

A flame-retardant antibacterial composite polypropylene filter material includes the following 5 components in weight percent: 73 wt % of isotactic polypropylene as a substrate, 10 wt % of modified maifanite as a functional negative ion-releasing material, 10 wt % of silver nanoparticles as a nano-antibacterial agent, 5 wt % of a combined material consisting of sodium diethylphosphinate, phosphate ester and phosphite ester as a flame retardant, and 2 wt % of polyacrylamide as a dispersant.

A preparation method of the flame-retardant antibacterial composite polypropylene filter material described in comparative example 2, including the following steps:

a) preparation of modified maifanite: 1000 mesh maifanite powder is weighed and put in a three-necked flask, DMF is added as a solvent, stirred and heated to 40° C. to keep a constant temperature, methacrylic anhydride is added dropwise and slowly into the three-necked flask, and a ratio of the maifanite powder, the DMF and the methacrylic anhydride is 1 g:100 ml:1 ml; the mixture is stirred fully for 3 h, a filtrate is filtered out, and the mixture is rinsed with alcohol for 4 times, then dried at 90° C. to obtain the modified maifanite;

b) preparation of the flame-retardant antibacterial composite polypropylene filter material: according to the weight percent of the components in comparative example 2, isotactic polypropylene substrate, the modified maifanite, a nano-antibacterial agent, a flame retardant and a dispersant are added into a mixer, fully mixed and then added into a twin-screw extruder; the screw speed is 50 r/min, and the temperatures in the extruder barrels are set as: 160° C. in the first zone, 170° C. in the second zone, 180° C. in the third zone, and 160° C. in the fourth zone; after the mixture is extruded by the extruder, the flame-retardant antibacterial composite polypropylene filter material is obtained.

Performance Test

The master batches of the flame-retardant antibacterial composite polypropylene filter materials obtained in embodiment 1, embodiment 2, comparative example 1 and comparative example 2 are injection molded into sheets by an injection molding machine at 210° C. and then placed at room temperature for 24 h to be subjected to various performance tests. The test results are shown in Table 1, and the test standards are as follows.

Release amount of negative ions is measured by KEC-900+ air negative oxygen ion tester (Shenzhen Wanyi Technology Co., Ltd.).

Antibacterial performance test is performed according to GB 21551.2-2010: Antibacterial and cleaning function for household and similar electrical appliances-Particular requirements of material.

Flame-retardant performance test is performed according to UL94: Test for Flammability of Plastic Materials for Parts in Devices and Appliances.

TABLE 1 performance test results of samples to be tested

| Sample | Flame retardancy | Antibacterial activity (E. coli) | Negative ions (ions/cm$^2$) |
| --- | --- | --- | --- |
| Embodiment 1 | V0 | >99.99% | 478.9 |
| Embodiment 2 | V0 | >99.99% | 951.2 |
| Comparative example 1 | V2 | >99.99% | 486.3 |
| Comparative example 2 | V0 | >99.99% | 295.3 |

In Table 1, V0 and V2 are flammability grades of UL94, and the flame-retardant grade V0 is enhanced compared with V2. V0: after two 10 s combustion tests on the sample, the flame is extinguished within 30 s without burnt substances falling off; V2: after two 10 s combustion tests on the sample, the flame is extinguished within 60 s, and some burnt substances fall off.

The difference between embodiment 1 and comparative example 1 is that the flame retardant in embodiment 1 is a combined material consisting of ammonium polyphosphate, pentaerythritol and melamine-formaldehyde resin, which has a total amount of 1 wt %, while the flame retardant in comparative example 1 is 1 wt % of the ammonium polyphosphate. Table 1 shows that the combined use of more than two kinds of flame retardants significantly improves the flame retardancy of the flame-retardant antibacterial composite polypropylene filter material due to synergistic flame retardancy. The difference between embodiment 2 and comparative example 2 is that the flame-retardant antibacterial composite polypropylene filter material of comparative example 2 does not contain graphene oxide, and the weight percent of the isotactic polypropylene in comparative example 2 is 3 wt % more than that in embodiment 2 (70 wt %). Table 1 shows that the contents of negative ions of the flame-retardant antibacterial composite polypropylene filter materials in embodiment 2 and comparative example 2 are 951.2 ions/cm$^2$ and 295.3 ions/cm$^2$, respectively. The results show that graphene oxide as a conductive modifier can enhance the negative ion-releasing capacity of the piezoelectric material (modified maifanite), and complement the antibacterial effect of the nano-antibacterial agent, and can effectively kill various bacteria, such as *Staphylococcus aureus* and *Escherichia coli*, etc. and inhibit their growth and reproduction.

The above descriptions are merely preferred embodiments of the present invention. The protection scope of the present invention is not limited to the above-mentioned embodiments, and all technical solutions under the idea of the present invention belong to the protection scope of the present invention. It should be pointed out that for ordinary technical personnel in the art, several improvements and refinements without departing from the principle of the present invention shall fall within the protection scope of the present invention.

What is claimed is:

1. A preparation method of a flame-retardant antibacterial composite polypropylene filter material, comprising the following steps:
   1) a preparation of a functional negative ion-releasing material: weighing a 500-1000 mesh piezoelectric material to put in a three-necked flask, adding N,N-dimethylformamide (DMF) as a solvent to obtain a first mixture, stirring and heating the first mixture to 30-50° C. and keeping a constant temperature, adding methacrylic anhydride dropwise and slowly into the three-necked flask to obtain a second mixture, wherein a mixing ratio of the 500-1000 mesh piezoelectric material, the DMF and the methacrylic anhydride is 1 g:100 ml:1 ml; stirring fully the second mixture for 1.5-4 h, filtering out a filtrate from the second mixture to obtain a third mixture and rinsing the third mixture with alcohol for 3-5 times to obtain a rinsed mixture, then drying the rinsed mixture at 50-100° C. to obtain the functional negative ion-releasing material;
   2) a preparation of the flame-retardant antibacterial composite polypropylene filter material: adding a fourth mixture consisting of 70-90 wt % of an isotactic polypropylene, 3-10 wt % of the functional negative ion-releasing material, 3-10 wt % of a nano-antibacterial agent, 2-5 wt % of a graphene oxide, 0.5-5 wt % of a flame retardant and 1-3 wt % of a dispersant into a mixer, and mixing the fourth mixture fully and performing melt-blending extrusion on the fourth mixture to obtain the flame-retardant antibacterial composite polypropylene filter materials;
   wherein the dispersant is at least one selected from the group consisting of polyacrylamide and fatty acid polyglycol ester.

2. The preparation method according to claim 1, wherein in step 1), the piezoelectric material is at least one selected from the group consisting of a modified tourmaline and a modified maifanite.

3. The preparation method according to claim 2, wherein in step 2), the fourth mixture is fully mixed and then added into a twin-screw extruder, after the fourth mixture is extruded by the twin-screw extruder, the flame-retardant antibacterial composite polypropylene filter material is obtained; working parameters of the twin-screw extruder are as follows: a screw speed is 50 r/min, and temperatures in extruder barrels of the twin-screw extruder are set as: 160° C. in a first zone, 170° C. in a second zone, 180° C. in a third zone and 160° C. in a fourth zone.

4. The preparation method according to claim 2, wherein the nano-antibacterial agent is at least one selected from the group consisting of silver nanoparticles, copper oxide nanoparticles and cuprous oxide nanoparticles.

5. The preparation method according to claim 4, wherein the flame retardant is at least two selected from the group consisting of ammonium polyphosphate, pentaerythritol, melamine-formaldehyde resin, aluminum hydroxide, sodium diethylphosphinate, phosphate ester and phosphite ester.

6. A flame-retardant antibacterial composite polypropylene filter material, wherein the flame-retardant antibacterial composite polypropylene filter material is prepared by the preparation method of claim 1, and
   the flame-retardant antibacterial composite polypropylene filter material consisting of the following components in weight percent: 70-90 wt % of the isotactic polypropylene, 3-10 wt % of the functional negative ion-releasing material, 3-10 wt % of the nano-antibacterial agent, 2-5 wt % of the graphene oxide, 0.5-5 wt % of the flame retardant and 1-3 wt % of the dispersant, wherein the dispersant is at least one selected from the group consisting of polyacrylamide and fatty acid polyglycol ester.

7. The flame-retardant antibacterial composite polypropylene filter material according to claim 6, wherein the functional negative ion-releasing material is a piezoelectric material.

8. The flame-retardant antibacterial composite polypropylene filter material according to claim 7, wherein the piezoelectric material is at least one selected from the group consisting of a modified tourmaline and a modified maifanite.

9. The flame-retardant antibacterial composite polypropylene filter material according to claim 8, wherein the nano-antibacterial agent is at least one selected from the group consisting of silver nanoparticles, copper oxide nanoparticles and cuprous oxide nanoparticles.

10. The flame-retardant antibacterial composite polypropylene filter material according to claim 9, wherein the flame retardant is at least two selected from the group consisting of ammonium polyphosphate, pentaerythritol, melamine-formaldehyde resin, aluminum hydroxide, sodium diethylphosphinate, phosphate ester and phosphite ester.

* * * * *